(No Model.)

B. L. E. GOWAN.
CRIBBING IRON FOR HORSES.

No. 420,054. Patented Jan. 28, 1890.

UNITED STATES PATENT OFFICE.

BENJAMIN L. E. GOWAN, OF BOSTON, MASSACHUSETTS, ASSIGNOR TO THE GOWAN MANUFACTURING COMPANY, OF SAME PLACE.

CRIBBING-IRON FOR HORSES.

SPECIFICATION forming part of Letters Patent No. 420,054, dated January 28, 1890.

Application filed September 2, 1889. Serial No. 322,698. (No model.)

*To all whom it may concern:*

Be it known that I, BENJAMIN L. E. GOWAN, of Boston, in the county of Suffolk, State of Massachusetts, have invented a certain new and useful Improvement in Cribbing-Irons, of which the following is a description sufficiently full, clear, and exact to enable any person skilled in the art or science to which said invention appertains to make and use the same, reference being had to the accompanying drawings, forming part of this specification, in which—

Figure 1:
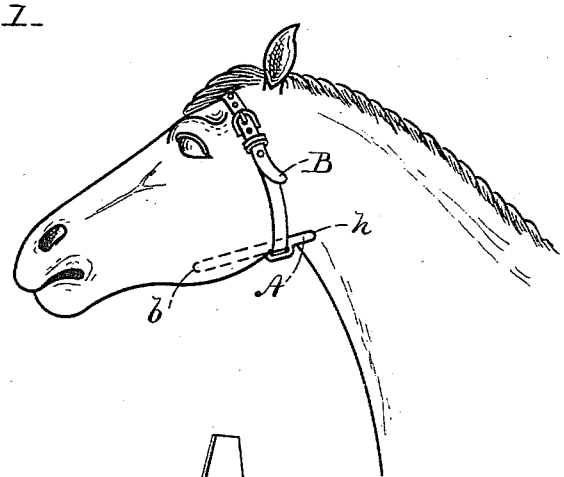
Figure 2:
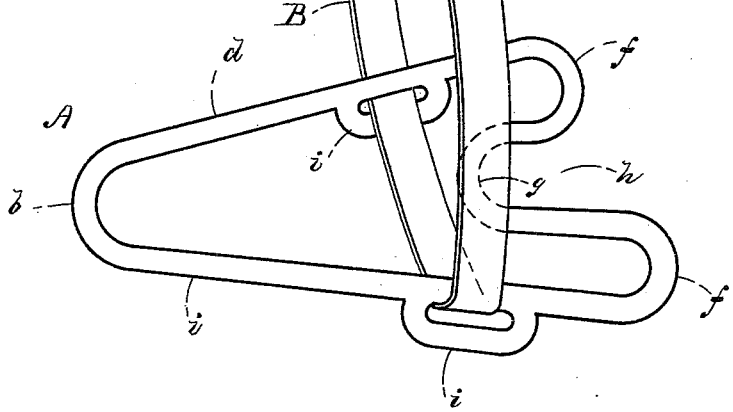

Figure 1 is a view showing my improvement in use on a horse, and Fig. 2 a perspective view of the cribbing-iron detached.

Like letters of reference indicate corresponding parts in the different figures of the drawings.

My invention relates to means for preventing crib-biting and wind-sucking in horses; and it consists in certain novel features, as hereinafter fully set forth and claimed, the object being to produce a simpler, cheaper, and more effective device of this character than is now in ordinary use.

The nature and operation of the improvement will be readily understood by all conversant with such matters from the following explanation.

In the drawings, A represents the cribbing-iron considered as a whole, and B the attaching-strap.

The iron consists of a strip of metal, preferably wire, bent into an approximate V shape. The point $b$ is rounded, and the opposite ends of the side pieces $d$ are curved inward toward each other at $f$ and joined together at $g$, forming a loop $h$ of a size adapted to partially encircle the windpipe of the horse. On each side piece $d$ a loop $i$ is formed to receive the strap B, which is provided with a buckle $k$ in the ordinary manner.

It is well known that in "cribbing" the horse arches his neck so that the cheeks nearly touch it. With the head distended in the ordinary positions for eating, &c., the horse will not crib-bite or "pull" when driving.

In the use of my improvement the iron A is disposed between the jowls, with the end $b$ bearing against the rear of the jaw and the loop $h$ against the windpipe, as shown in Fig. 1. The strap B is passed through the loops $i$ and around the head of the horse above the eyes, being secured by its buckle and holding the iron firmly in place. The iron as thus arranged does not interfere with the feeding of the horse; but as soon as the neck is craned or arched, as described, the point $b$ takes against the jaw and forces the loop $h$ tightly against the windpipe. This at once prevents the animal from cribbing, and after a few repetitions is found in practice to entirely cure him of the habit.

Instead of forming the iron A from wire, as described, it may be constructed of a solid plate cut into the desired form.

Having thus explained my invention, what I claim is—

1. A device for preventing animals from crib-biting, &c., comprising an approximately V-shaped body adapted to be disposed between the jowls and a strap or similar means for securing said body in position, whereby it will be forced against the windpipe of the animal when the neck is arched, substantially as described.

2. A cribbing-iron comprising an approximately V-shaped body having a rounded point and its opposite end provided with a loop for the windpipe, and means, substantially as described, for attaching said body to the animal.

3. The iron A, provided with the loop $h$ and strap-loops $i$, in combination with the attaching-strap B, substantially as described.

BENJ. L. E. GOWAN.

Witnesses:
O. M. SHAW,
E. F. MCCARTY.